United States Patent
Martínez Sanz et al.

(10) Patent No.: US 9,255,724 B2
(45) Date of Patent: Feb. 9, 2016

(54) SYSTEM FOR SUPPORTING AN EVAPORABLE GETTER OR VACUUM GAUGE

(75) Inventors: Noelia Martínez Sanz, Seville (ES); Javier Asensio Pérez Ullivarri, Seville (ES); Pablo José Bombin Ortega, Seville (ES); Javier Peláez Fombellida, Seville (ES); José Ángel Rico Sánchez, Seville (ES); Daniel Montes García, Seville (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 605 days.

(21) Appl. No.: 13/500,197
(22) PCT Filed: Oct. 4, 2010
(86) PCT No.: PCT/ES2010/000405
§ 371 (c)(1), (2), (4) Date: Jun. 14, 2012
(87) PCT Pub. No.: WO2011/042579
PCT Pub. Date: Apr. 14, 2011

(65) Prior Publication Data
US 2012/0241575 A1    Sep. 27, 2012

(30) Foreign Application Priority Data
Oct. 5, 2009    (ES) .................................. 200901949

(51) Int. Cl.
*F16L 51/02* (2006.01)
*F24J 2/05* (2006.01)
(Continued)

(52) U.S. Cl.
CPC ...... *F24J 2/05* (2013.01); *F24J 2/4616* (2013.01); *F24J 2002/5275* (2013.01)

(58) Field of Classification Search
CPC ... F24J 2/4616; F24J 2/055; F24J 2002/5275; F16B 5/06; F16B 7/0473; F16B 12/38; H01J 7/186
USPC ........... 248/316.7, 231.81, 230.7, 228.7, 302, 248/175, 107, 153, 220.21, 220.22, 222.11, 248/222.12, 223.41, 225.11; 24/457, 3.1, 24/3.12, 326, 570; 126/653, 651, 652, 126/655; 313/481, 558–561; 417/48; 403/291, 220, 326
See application file for complete search history.

(56) References Cited

U.S. PATENT DOCUMENTS

| | | | | | |
|---|---|---|---|---|---|
| 649,338 | A | * | 5/1900 | McGill | ............ A47G 7/045 248/302 |
| 1,077,027 | A | * | 10/1913 | Austin | ................ 248/315 |

(Continued)

FOREIGN PATENT DOCUMENTS

| CN | 201191088 | 2/2009 |
|---|---|---|
| CN | 101392965 | 3/2009 |

(Continued)

OTHER PUBLICATIONS

Supplementary European Search Report competed Jan. 21, 2015 for European Patent Application No. EP10821606 filed Oct. 4, 2010, all pages.

*Primary Examiner* — Jonatahan Liu
*Assistant Examiner* — Guang H Guan
(74) *Attorney, Agent, or Firm* — Kilpatrick Townsend & Stockton LLP

(57) ABSTRACT

System for supporting an evaporable getter, which can be installed in any type of solar power receiving tube and which is mounted using an automated method. The system consists of a clip-type supporting element having a substantially thin profile and an S-shaped base, the upper part thereof including a ring in which the pellet of evaporable getter is housed. The pellet is supported by the pins of the supporting element, dispensing with the need for an additional contact part in order to secure the pellet. The clip is secured to the bellows-type expansion compensator, such that it remains inside the vacuum zone of the solar power receiving tube.

3 Claims, 2 Drawing Sheets

(51) Int. Cl.
*F24J 2/46* (2006.01)
*F24J 2/52* (2006.01)

(56) References Cited

U.S. PATENT DOCUMENTS

| | | | | |
|---|---|---|---|---|
| 1,341,811 A | * | 6/1920 | Lutz | 24/3.6 |
| 1,590,172 A | * | 6/1926 | Thorberg | A01K 11/00 |
| | | | | 206/303 |
| 1,599,511 A | * | 9/1926 | Brown | A45D 1/00 |
| | | | | 126/226 |
| 1,750,894 A | * | 3/1930 | Kramer | G09F 1/14 |
| | | | | 248/175 |
| 2,928,925 A | * | 3/1960 | Thall et al. | 417/48 |
| 3,532,318 A | * | 10/1970 | Lloyd | 248/311.2 |
| 3,906,282 A | * | 9/1975 | Krackhardt | H01J 29/94 |
| | | | | 313/418 |
| 3,979,806 A | * | 9/1976 | Woodard | 445/70 |
| 4,101,247 A | * | 7/1978 | Pirota et al. | 417/48 |
| 4,230,966 A | * | 10/1980 | Compen | 313/481 |
| 4,442,828 A | * | 4/1984 | Takeuchi | F24J 2/02 |
| | | | | 126/681 |
| 4,508,104 A | | 4/1985 | Takeuchi et al. | |
| 4,649,903 A | * | 3/1987 | Takeuchi et al. | 126/653 |
| 4,962,654 A | | 10/1990 | Zbornik | |
| 5,386,432 A | * | 1/1995 | Ficalora et al. | 372/94 |
| 5,541,474 A | * | 7/1996 | LaPeruta et al. | 313/481 |
| 7,493,677 B2 | | 2/2009 | Muller et al. | |
| 7,552,726 B2 | * | 6/2009 | Kuckelkorn | F24J 2/055 |
| | | | | 126/651 |
| 7,830,090 B2 | * | 11/2010 | Seon et al. | 313/560 |
| 7,994,697 B2 | * | 8/2011 | Park | H01J 7/186 |
| | | | | 313/481 |
| 9,032,625 B2 | * | 5/2015 | Martinez Sanz | F24J 2/055 |
| | | | | 29/890.033 |
| 2004/0134484 A1 | | 7/2004 | Barkai et al. | |
| 2006/0175488 A1 | * | 8/2006 | Schmiddem et al. | 248/213.2 |
| 2010/0126499 A1 | * | 5/2010 | Lu | F24J 2/055 |
| | | | | 126/651 |
| 2012/0241575 A1 | * | 9/2012 | Martinez Sanz | F24J 2/05 |
| | | | | 248/231.81 |

FOREIGN PATENT DOCUMENTS

| | | | |
|---|---|---|---|
| CN | 201209968 | 3/2009 | |
| DE | 10228883 | 2/2004 | |
| ES | 2 039 935 | 10/1993 | |
| ES | 2 241 437 | 10/2005 | |
| ES | 2 277 529 | 7/2007 | |
| JP | 56160550 A | * 12/1981 | F24J 3/02 |

* cited by examiner

SYSTEM FOR SUPPORTING AN EVAPORABLE GETTER OR VACUUM GAUGE

TECHNICAL FIELD OF THE INVENTION

The present invention describes a vacuum gauge or evaporable getter system as those used in power receiving tubes.

BACKGROUND OF THE INVENTION

A vacuum gauge or evaporable getter consists in a deposit of a volatile and reactive material which is introduced inside the vacuum zone such that, once the zone has been sealed, the material is heated and evaporates, settling on the walls of the borosilicate tube and leaving a covering that will change colour due to oxidation if any vacuum loss takes place. They are usually used in vacuum tubes and the getter material used is barium. For big tubes, getters that are more complex are typically used, including aluminium, magnesium, calcium, sodium, strontium, caesium, and phosphorus.

The evaporable getter of the invention will be used in a vacuum tube as those employed as solar receptors. In general, those receptors comprise two concentric tubes between which a vacuum is generated. The internal tube, inside which the fluid being heated circulates, is metallic and the external tube is made of glass, usually borosilicate.

Between both tubes, a bellow shaped expansion compensator device is placed, such that it allows a relative movement between the absorbing tube and the glass tube, absorbing the strains that might be created by the difference existing between the expansion coefficients of both and thus ensuring the vacuum.

Besides the expansion compensator device, this type of tubes requires the installation of materials for detecting and suppressing the hydrogen molecules that might enter into the vacuum zone. These molecules are produced by the thermal degeneration that undergoes the oil used as heat-transfer fluid and that circulates inside the metallic tube, due to the high temperature that it reaches. These molecules end up passing through the metallic tube and entering into the vacuum zone, increasing looses, and consequently decreasing in a significant way the system effectiveness.

That is why there is always non evaporable-type getter alloys installed in the vacuum zone so that, in case there is any $H_2$ molecule, it is uptaken by the surface of this material.

However, in addition to the non-evaporable getters, which solve the particles leakage, there are also installed evaporable getters, which detect if there have been any vacuum losses.

The development of the invention hereby disclosed describes a new geometry for supporting an evaporable getter.

Several background of this type of getters can be named, among others the patent ES 2241437 A1 of SCHOTT. This document discloses a clamp to retain the elements supporting the getters (or vacuum gauges). This clamp comprises a zone for supporting the evaporable element and the zone serving as a support in the receiving tube. Said zones count with certain resilience and are made with plates. Both zones are provided with pins for attaching them to the receiving tube and for supporting the tube. The pins of both zones are joined together through two flexural rigid edges.

This geometry is adapted to the type of receiving tube owned by the applicant SCHOTT, but would not be valid for other designs in which, for example, there might be a borosilicate tube, concentric with an absorbing tube, given that it would interfere with the last, besides requiring a completely hand-made assembly.

The patent US2004134484 also discloses another getter support, but in this case, it is formed by a channel (37) thereto are coupled pins (36) that secure it to the absorbing tube.

The patent CN201209968 also discloses an evaporable getter support that can be secured more easily to the absorbing tube but that also requires several pieces and welding for its manufacturing and positioning.

This is the reason why the object of the present invention is to provide a new geometry or a new design for supporting an evaporable getter, such that it can be adapted to all kinds of receiving tubes besides attaining a more automated assembly.

DESCRIPTION OF THE INVENTION

The invention consists of a system for supporting an evaporable getter designed as an alternative to those already available in the marketplace, so it can be installed in any type of solar power receiving tubes and that is mounted by means of a method that is much more automated than those used until now.

Unlike the known prior art, this system consists of a clip-type supporting element made of one single clip-type piece, having a substantially thin profile and the upper part thereof has a ring shape, given that this is where the evaporable getter pellet is housed. Said pellet is supported by the pins of the supporting element itself, dispensing with the need for an additional contact part unlike most of the supports in the actual prior art.

This dip is fixed to the bellows-type expansion compensator, such that it remains inside the future vacuum zone, and in such a way that it can be acceded to and handled from the outside, until the moment in which the tube end is closed in order to perform said vacuum.

Furthermore, the supporting part has a homogenized thickness, which ensures a sufficient and constant section to generate the electric field required for its heating as well as for supporting high temperatures.

The basic properties for this evaporable getter support are:
Excellent corrosion resistance
An excellent hygiene-cleanliness factor
Easy manufacturing and cutting
It does not harden due to thermal treatments
It can be used both at cryogenic temperatures and at high temperatures
Easy mounting All these properties achieve a significant advance with regard to the known prior art.

DESCRIPTION OF THE DRAWINGS

To complete the description that is being made, and for a better comprehension of the invention, a set of drawings are enclosed, wherein, as a way of illustration only and not by ways of limitation, the following are represented.

PREFERRED EMBODIMENT OF THE INVENTION

For comprehensive purposes of the invention, the support for the evaporable getter is going to be described next according to a preferred embodiment thereof.

Figure 1:
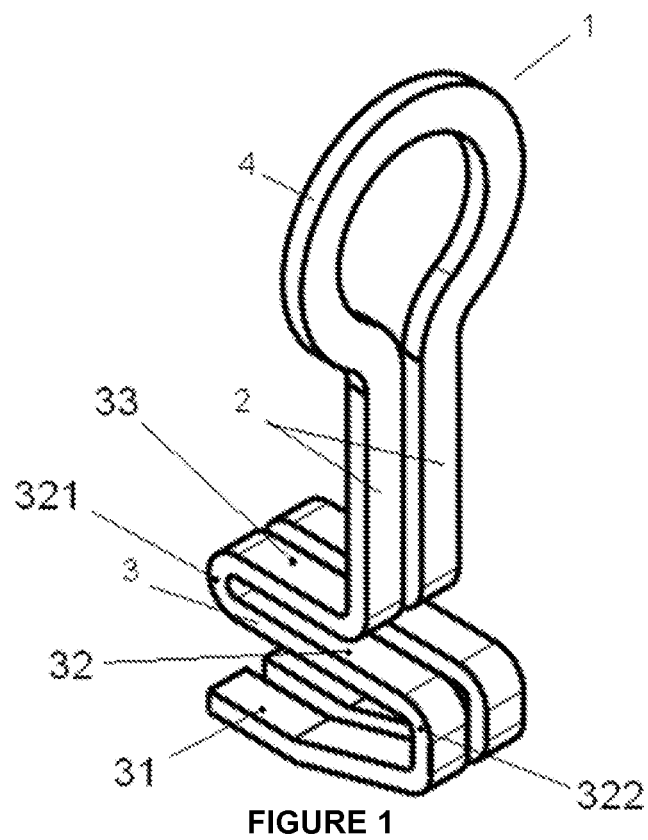
FIG. 1: Perspective view of the support
Figure 2:
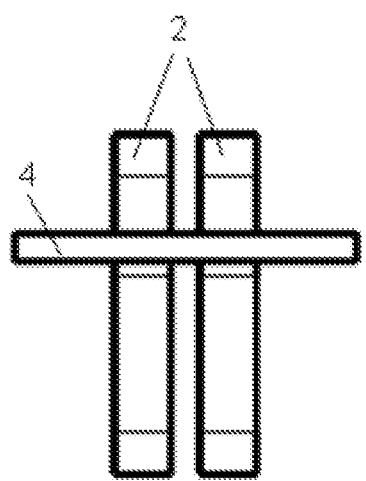
FIG. 2: Plant view of the support
Figure 3:
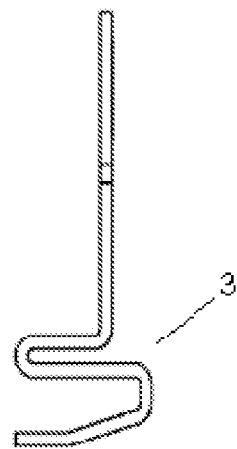
FIG. 3: Elevational view of the support
Figure 4:
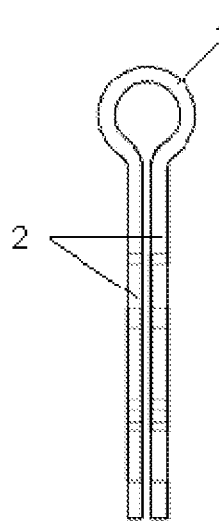
FIG. 4: Side view of the support

Firstly and as it is shown in FIG. 1, we can see the support (1) in perspective. It can be observed that it relates to a clip-shaped support (1), made up by one single piece, formed by two pins (2) that in their lower part, as it can be seen in the side view of FIG. 4, are folded forming a slightly deformed "S" (3) and that are joined together in their upper part forming a ring (4). The deformed "S" shape has a lower segment (31), a middle segment (32), and an upper segment (33), the lower (31), middle (32) and upper (33) segments being generally parallel to each other, wherein the lower and middle segments of the lower part of each of the two pins are joined at a first end (322) of the middle segment (32) and the middle and upper segments of the lower part of each of the two pins are joined at a second end (321) of the middle segment (32) opposite the first end (322), and the upper parts of the two pins are bent to depart substantially perpendicularly upward from the upper segments (33) and are joined together to form the ring (4). As it can be seen in the elevational view exhibited in FIG. 3, this ring is where the evaporable getter pellet (5) will be placed (FIG. 5).

Figure 5:
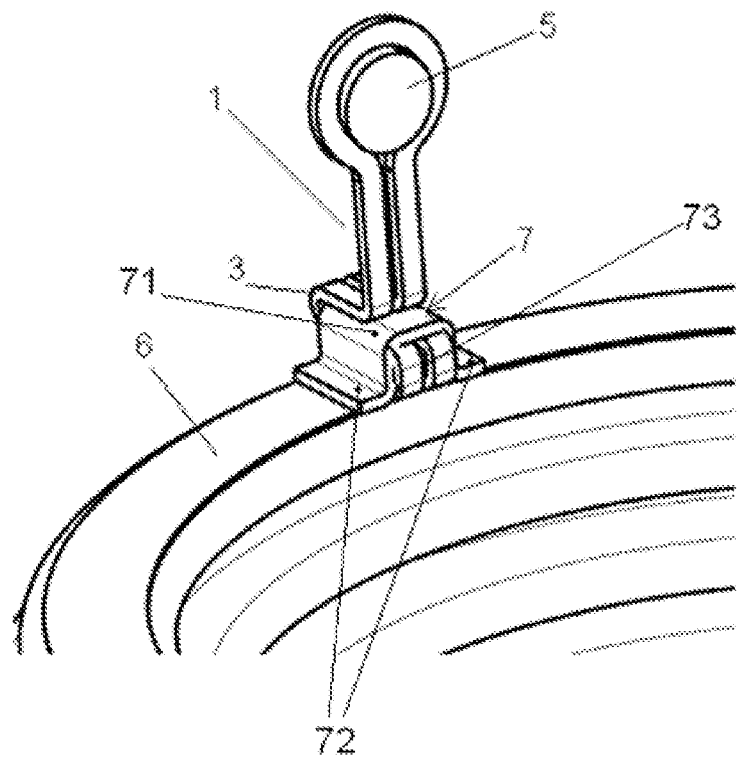
FIG. 5: Perspective view of the support placed on the compensator.

In FIG. 5, it can be observed how the support (1) is fastened inside the receiving tube: the clip (3) shape of the lower part allows attaching this support easily to the expansion compensator element (6), which in turn is secured by a bridge-shaped attaching element (7).

The bridge-shaped attaching element (7) has a central portion (71) and two ends (72), the two ends affixed to a surface of the expansion compensator element (6) and the central portion (71) spaced from the surface of the expansion compensator element (6), forming an opening (73) between the central portion (71) of the bridge-shaped attaching element (7) and the surface of the expansion compensator element (6).

In a preferred embodiment, the thickness will be 1 mm and it will have any desired height and geometrically allowed, without affecting its functionality.

The support is placed on the base of the compensator, accessible and operable from the outside to the inside, and being operable during the whole process with the exception of the activity following the vacuum process execution.

Next, one of the possible manufacturing process and its functionality are explained, as well as the characteristics of the support which were adopted when using this design.

The manufacturing process starts from an austenitic strapping steel on which, by means of a cutting template or a similar method, can be obtained the standard of the unfold piece, which can be cut either by water jet, laser or any equivalent mean, with minimum deviation.

Afterwards a series of sequential foldings are performed in order to obtain the dip (3) geometry. These foldings are performed using a procedure requiring low levels of accuracy and effort.

The manufacturing ends up with the folding phase, given that there it is not necessary to perform any mechanized or finishing operations on the piece, since the intrinsic characteristics of the material are enough, taking into account the use that is made thereof.

The use of an austenitic steel, in addition to its structural and thermal properties (since it keeps very good mechanical and physical characteristics at high temperatures) is based on its compatibility when it comes to its welding (the bridge-shaped support (7) must be welded to the expansion compensator ring (6)) given that both pieces to be joined are made from the same material.

This system is specially designed to be applied in an evaporable getter support for solar receiving tubes, but it cannot be disregarded to extend its use to other fields of the industry requiring similar characteristics.

The invention claimed is:

1. A system for supporting an evaporable getter or a vacuum gauge, comprising:
   a clip shaped support having a homogeneous thickness, and made of a single piece that includes two pins, each of the two pins including a lower part, and an upper part, the lower part of each of the two pins being folded to form a deformed "S" shape having a lower segment, a middle segment, and an upper segment, the lower, middle, and upper segments being generally parallel to each other, wherein the lower and middle segments of the lower part of each of the two pins are joined at a first end of the middle segment and the middle and upper segments of the lower part of each of the two pins are joined at a second end of the middle segment opposite the first end, and the upper parts of the two pins are bent to depart substantially perpendicularly upward from the upper segments and are joined together to form a ring;
   an expansion compensator element; and
   a bridge-shaped attaching element having a central portion and two ends, the two ends affixed to a surface of the expansion compensator element and the central portion spaced from the surface of the expansion compensator element, forming an opening between the central portion of the bridge-shaped attaching element and the surface of the expansion compensator element;
   wherein the lower part of each of the two pins is fastened by the bridge-shaped attaching element.

2. The system according to claim 1, wherein the ring is configured for connecting to an evaporable getter pellet.

3. The system according to claim 1, wherein the clip shaped support is made of austenitic steel.

* * * * *